United States Patent
Bergles

[11] 3,927,904
[45] Dec. 23, 1975

[54] REAR DERAILLEUR FOR A BICYCLE
[75] Inventor: Eduard Bergles, Graz, Austria
[73] Assignee: Fichtel & Sachs A.G., Schweinfurt am Main, Germany
[22] Filed: Mar. 6, 1974
[21] Appl. No.: 448,619

[30] Foreign Application Priority Data
Mar. 23, 1973 Germany............ 2314554

[52] U.S. Cl.............. 280/236; 74/217 B
[51] Int. Cl.² ........................... B62M 9/12
[58] Field of Search ......... 280/236, 237, 238, 261; 74/217 B

[56] References Cited
FOREIGN PATENTS OR APPLICATIONS
| | | | |
|---|---|---|---|
| 830,162 | 6/1938 | France | 74/217 B |
| 811,522 | 9/1936 | France | 280/261 |
| 559,305 | 3/1957 | Italy | 74/217 B |
| 64,341 | 11/1955 | France | 74/217 B |
| 456,599 | 4/1950 | Italy | 74/217 B |
| 844,979 | 5/1939 | France | 74/217 B |

Primary Examiner—Leo Friaglia
Assistant Examiner—Jack D. Rubenstein
Attorney, Agent, or Firm—Hans Berman; Kurt Kelman

[57] ABSTRACT

To reduce chain distortion and the resulting frictional drag in the drive chain, particularly during speed change, when a guide wheel of the rear derailleur of a bicycle does not rotate in a common plane with an associated chain wheel on the crank or pedal shaft of the bicycle, the guide wheel is tilted toward the plane of rotation of the chain wheel when it is axially shifted out of that plane during normal changes in transmission ratio.

5 Claims, 6 Drawing Figures

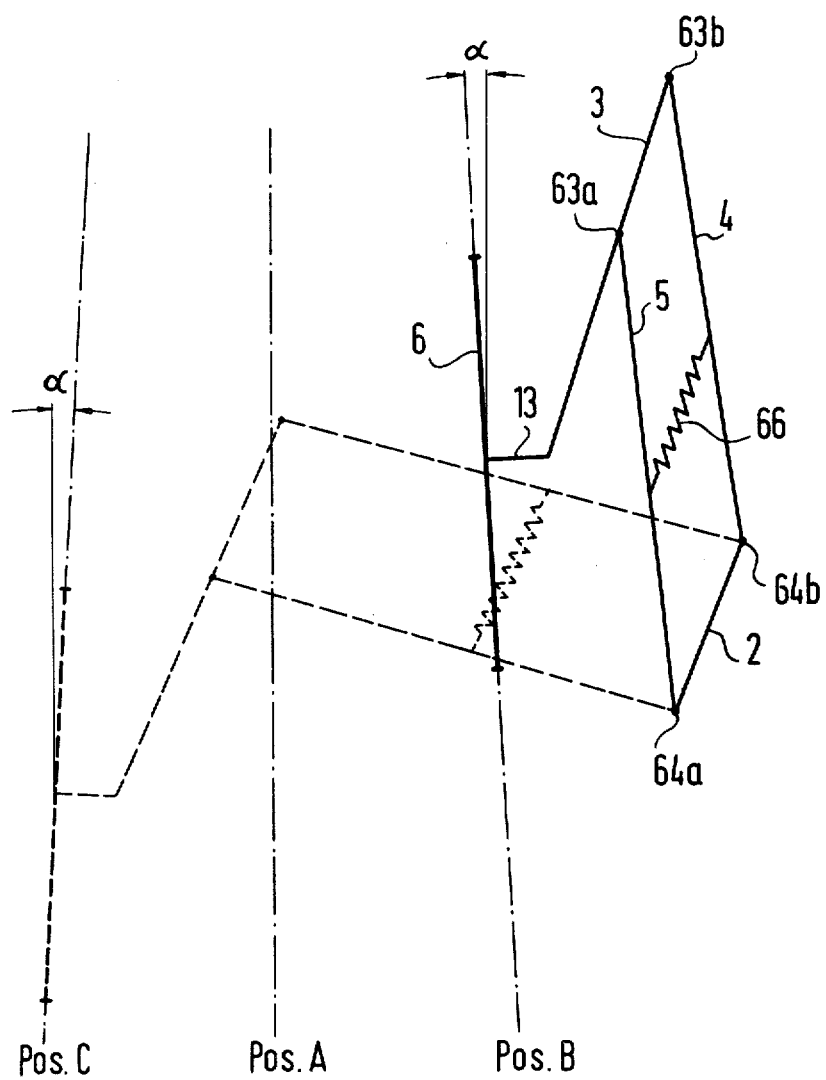

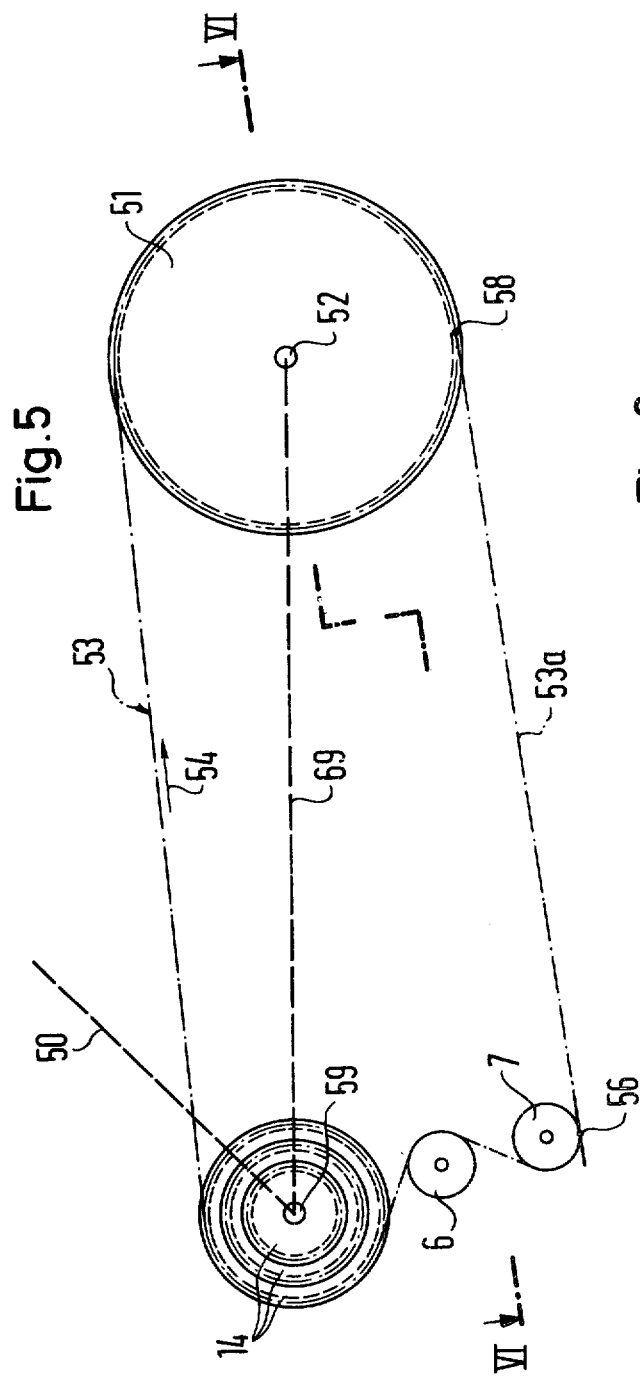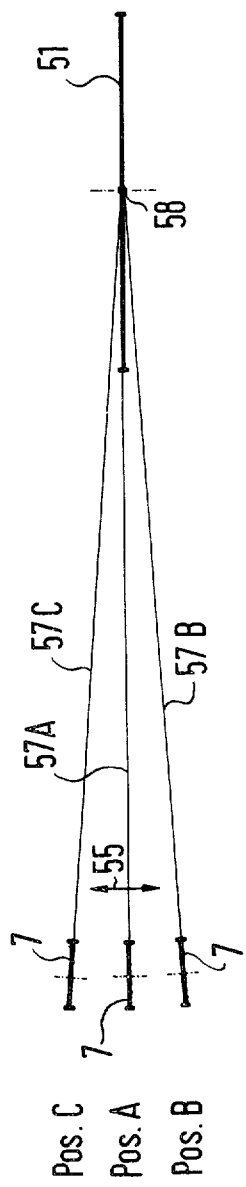

REAR DERAILLEUR FOR A BICYCLE

This invention relates to bicycles and like vehicles, and particularly to an improvement in a rear derailleur arrangement for such a vehicle.

Bicycles in which the transmission ratio between the pedals and the rear wheel is changed by moving a drive chain between several sprockets of different diameter mounted in axially juxtaposed position on the rear wheel hub are equipped with a rear derailleur, essentially consisting of at least one guide wheel near the rear-wheel axis and an operator-controlled mechanism for shifting the guide wheel into respective positions of at least approximate radial alignment with the sprockets on the rear wheel so that the drive chain, whose lower strand is trained over the chain wheel, the guide wheel, and one sprocket is "derailed" to another sprocket.

As is inherent in such an arrangement, the guide wheel can rotate in a common plane with the chain wheel at only one transmission ratio or speed, and the lower strand of the chain is distorted more or less at all other speeds, the axes of the chain wheel, the rear wheel, and the guide wheel being parallel in a properly adjusted, conventional bicycle of the type described. The distortion accelerates wear of the chain, causes energy loss by friction, and makes shifting relatively difficult.

It has now been found that, other things being equal, the pedalling and speed shifting effort is reduced slightly, but significantly, when the guide wheel is tilted during its axial adjustment in such a manner that a line connecting the point of last chain engagement with the chain wheel with the point of first chain engagement with the guide wheel coincides with or closely approaches a tangent drawn on the guide wheel at the point of first chain engagement. The primary object of this invention is the provision of a derailleur arrangement which permits such operation. Another object is the provision of a bicycle or like vehicle equipped with the improved derailleur arrangement.

A vehicle according to the invention has a frame, a chain wheel mounted on the frame for rotation about a first axis, and a rear wheel shaft on the frame having a second axis spaced from and substantially parallel to the first axis. A cluster of sprockets rotate about the second axis in axially juxtaposed relationship. A carrier is fixedly fastened to the frame and connected by a linkage to a guide wheel support on which a guide wheel is mounted for rotation in a plane fixed relative to the support. A drive chain is trained over the chain wheel, one of the sprockets, and the guide wheel, and the support may be shifted relative to the carrier in the direction of the second axis by a manual operating mechanism. The linkage includes guide means for tilting the plane of rotation of the guide wheel toward and away from a position perpendicular to the second axis in response to the shifting of the support.

Other features, additional objects, and many of the attendant advantages of this invention will readily be appreciated as the same becomes better understood by reference to the following detailed description of a preferred embodiment when considered in connection with the appended drawing in which:

FIG. 4 illustrates the movement of elements of the derailleur arrangement in conventional symbols;

FIG. 5 is a simplified and fragmentary view of the same bicycle in side elevation; and FIG. 6 illustrates relationships of elements of the apparatus of FIG. 5 in section on the line VI — VI by conventional symbols.

Figure 1:
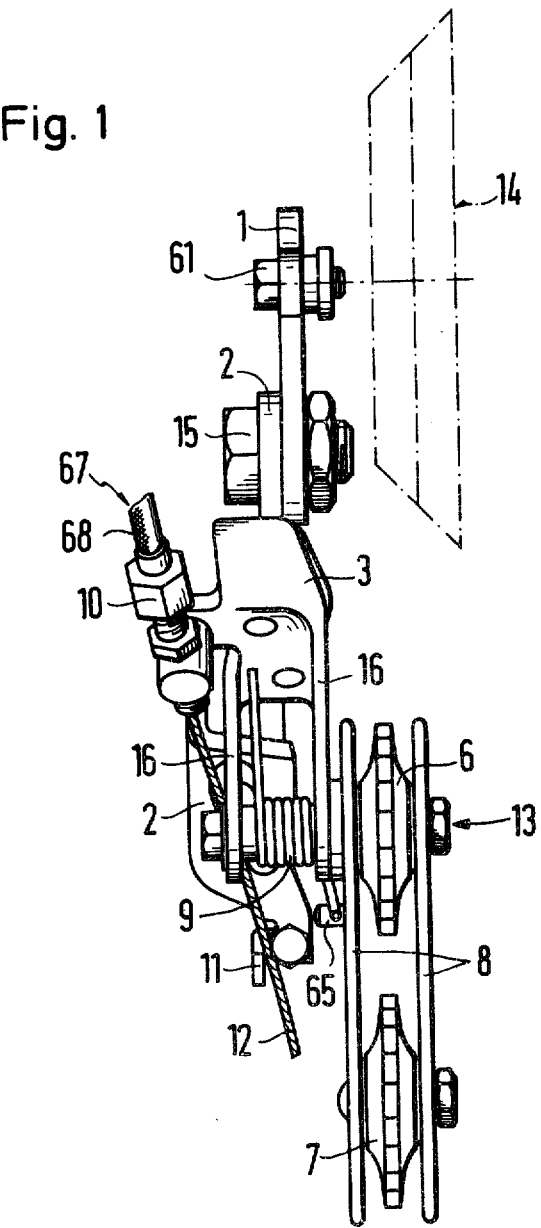
FIG. 1 shows a bicycle equipped with a derailleur arrangement of the invention in fragmentary front elevation and partly in phantom lines.
Figure 2:
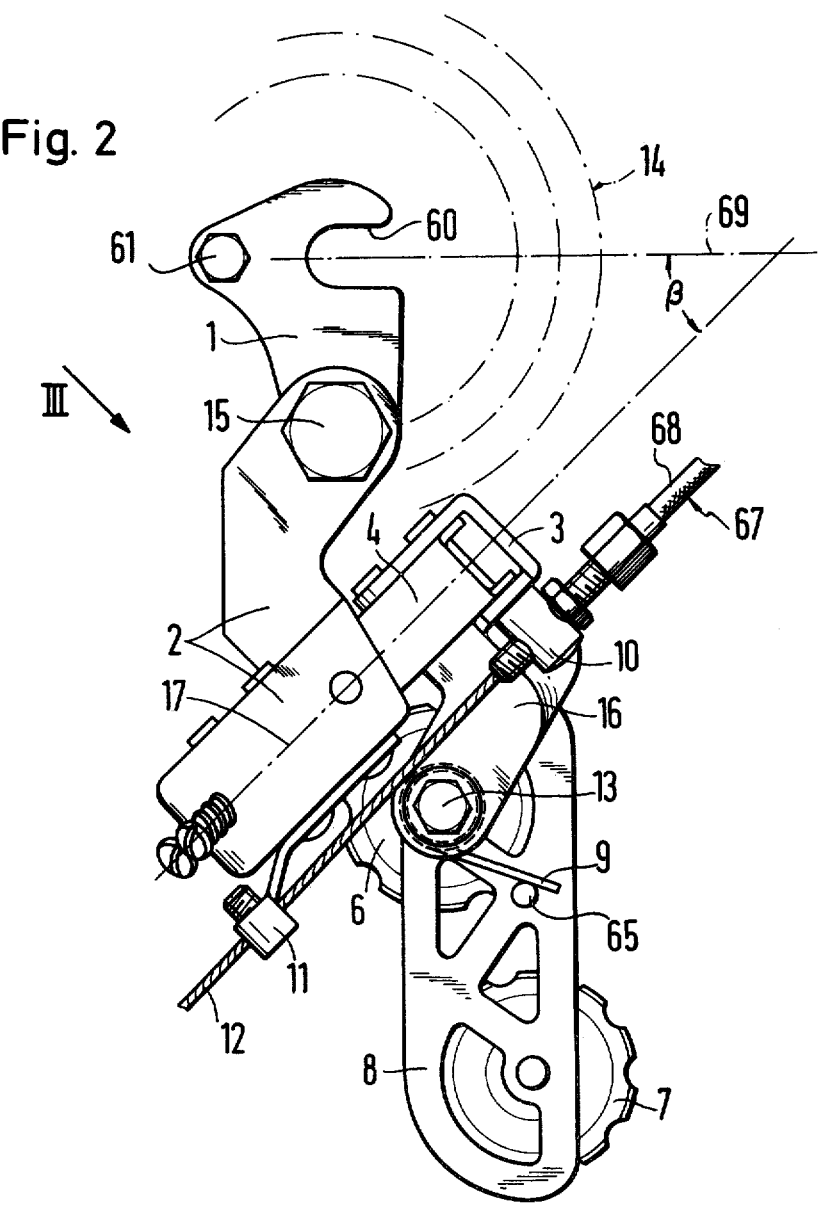
FIG. 2 illustrates the apparatus of FIG. 1 in side elevation.
Figure 3:
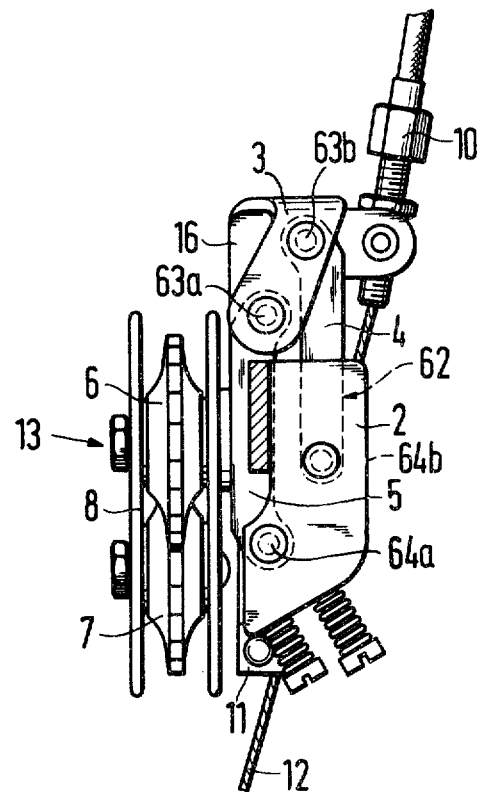
FIG. 3 is a view of the derailleur of FIG. 2 taken in the direction of the arrow III.

FIGS. 1 to 3 show only as much of an otherwise conventional bicycle as is needed for an understanding of the derailleur mechanism more fully shown in these Figures. Reference will be had first, therefore, to FIGS. 5 and 6 which represent conventional elements of a bicycle by symbols. The bicycle frame 50 is equipped with a chain wheel 51 whose shaft 52 carries the pedal cranks, not shown. A shaft 59, fixedly mounted in the rear end portion of the frame 50 rotatably supports a wheel and a cluster of three sprockets 14 mounted on the rear wheel hub, the wheel itself not being shown. The sprockets vary in diameter and are axially juxtaposed in the shaft 59 to define a conical enveloping surface.

A chain 53 moves in the direction of the arrow 54 during normal forward pedalling from the chain wheel 51 over two guide wheels 7, 6, one of the sprockets 14, and back to the chain wheel 51. The guide wheel 7 simultaneously serves as a tensioning wheel, as is conventional in itself and will be described more fully hereinbelow.

For changing the transmission ratio between the chain wheel shaft 52 and the rear wheel, the guide wheels 7, 6 are shifted in the direction of the rear wheel axis as indicated in FIG. 6 by a double arrow 55. Whereas the common plane of rotation of the guide wheels 7, 6 remains parallel to itself and to the plane of rotation of the rear wheel in conventional derailleurs during changes in transmission ratio, the guide wheels of the invention are tilted in response to their axial shifting movement as is shown in FIG. 6.

In the Position A, the guide wheels rotate in a common plane 57A with the axially central sprocket 14, not itself seen in FIG. 6, and with the chain wheel 51. When the chain is to be shifted to one of the other sprockets 14, the guide wheels are moved axially and simultaneously tilted so that their common plane of rotation 57B, 57C passes through the point 58 of disengagement of the lower strand 53a of the chain, which moves rearward during normal pedalling, from the chain wheel 51. The chain strand 53a tangentially engages the wheel 7 at the point 56 of first engagement.

While the mode of operation illustrated in FIGS. 5 and 6 would best accomplish the principal objects of this invention, the geometrical relationship between the plane of rotation of the guide wheel 7 and of the point 58 on the chain wheel 51 need only be approached closely since the chain 53 is capable of some lateral distortion without significant increase in friction. The bicycle is easily shifted from one speed to another if actual conditions are only slightly different from those seen in FIG. 6. It is essential that the planes 57B, 57C, or their lines of intersection with the plane 69, defined in FIG. 5 by the axes of the shafts 52, 59 converge in a direction from the shaft 59 toward the shaft 52.

The derailleur arrangement which permits the operating procedure described above is shown in more detail in FIGS. 1 to 3. The mounting base or carrier 2 of the rear derailleur is attached to the rear wheel shaft 59 by means of a hook or lug 1 adjustably secured to the carrier by a bolt 15 and a nut. The shaft 59, not itself seen in FIGS. 1 to 3, is received in a notch 60 of the lug 1 and secured by the non-illustrated nut conventionally employed for fastening the shaft between the chain stays of the frame 50. A screw 61 additionally permits the lug 1 to be fastened to a chain stay to prevent unintended angular movement of the lug 1 about the axis of the rear wheel shaft 59.

A guide wheel support 3 is connected to the carrier 2 by means of a four-member linkage 62 constituted by portions of the carrier 2 and the guide wheel support 3, and by two guide links 4, 5. Pivots 63a, 64a secure the link 5 to the support 3 and the carrier respectively, and the link 4 is similarly secured by pivots 63b, 64b. The axes of the pivots are parallel to each other and define a quadrangle located in a plane 17 which is inclined to the plane 69 defined by the axes of the rear wheel shaft 59 and of the crank shaft 52 by an angle $\beta$ of approximately 45° to 60°.

Two integral lugs 16 of the guide wheel support 3 form a fork on which a guide wheel shaft 13 is mounted parallel to the shaft 59. The guide wheel 6 and two side plates 8 of a guide wheel cage are rotatably mounted on the shaft 13. The cage includes a fixed shaft parallel to the shaft 13 which connects the side plates 8, and on which the guide wheel 7 is mounted for rotation in a common plane with the guide wheel 6. The wheel 7 also prevents slack in the lower chain strand 53a because a helical torsion spring 9, coiled about the shaft 13, has straight ends which abut against the support 3 and an abutment pin 65 on one of the plates 8 respectively, and tends to pivot the cage in a direction to tension the chain, not itself seen in FIGS. 1 to 3. The guide wheel 7 thus functions also as a tensioning wheel.

A helical tension spring 66 shown in FIG. 4, but omitted from other Figures for the sake of clarity, biases the two guide links 4, 5 toward each other, thereby biasing the four-member linkage 62 toward the position indicated by fully drawn lines in FIG. 4 in which the guide wheels 6, 7 are radially aligned with the smallest sprocket 14. This position is shown in FIG. 6 as Position B.

The guide wheels 6, 7 are shifted in the direction of the axis of rotation of the rear wheel by a Bowden cable 67 of which only one end is visible in the drawing, the non-illustrated end being fastened to a derailleur shifter lever on the front end of the bicycle frame or on the handle bars for manual operation by the rider of the bicycle in a conventional manner. The outer sleeve 68 of the Bowden cable 67 is secured to a bracket 10 on the support 3. The inner wire 12 passes freely through the bracket 10 and is attached to bracket 11 on the carrier 2. The linkage 62 may be shifted into the position shown in broken lines in FIG. 4 by means of the Bowden cable.

The axes of the pivots 63a, 63b associated with the support 3 are somewhat closer spaced than the axes of the pivots 64a, 64b associated with the carrier 2. The spacing of the pivot axes along the links 4 and 5 is the same. Because the quadrangle of the four-member linkage 62 is not an exact parallelogram, the plane of rotation of the guide wheels 6, 7 is not only shifted in the direction of the rear wheel axis by the Bowden cable 67 and the spring 66, but additionally tilted through the small acute angle $\alpha$ from the Position A, the magnitude of the angle appearing different in FIGS. 4 and 6 due to perspective distortion by the angle $\beta$.

While the invention has been described with reference to a derailleur cooperating with a cluster of sprockets on the rear wheel of a bicycle, it is equally applicable to vehicles having more than two wheels, and to vehicles in which not the rear wheel, but a front wheel is driven.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A vehicle comprising:
   a. a frame;
   b. a chain wheel mounted on said frame for rotation about a first axis;
   c. a wheel shaft on said frame having a second axis spaced from and substantially parallel to said first axis;
   d. a plurality of sprockets axially juxtaposed on said wheel shaft for rotation about said second axis;
   e. a carrier member fastened to said frame in fixed spatial relationship to said second axis;
   f. a guide wheel support;
   g. first and second guide wheels mounted on said support in spaced relationship for rotation in a common plane fixed relative to said support;
   h. linkage means movably connecting said support to said carrier member,
      1. said first and second axes defining a plane intersecting the plane of rotation of said guide wheel along a line of intersection in each position of said support during said shifting of said support, the lines of intersection defined during said shifting converging in a direction from said second axis toward said first axis,
      2. said linkage means including a four-member linkage constituted by said carrier member, said support, two guide links, and four pivots respectively connecting said guide links to said carrier member and to said support,
      3. two pivots being associated with each member of said linkage,
      4. each pivot having an axis,
      5. the spacing of the two axes of the pivots associated with one member of said four-member linkage being different from the corresponding spacing of axes of pivots associated with the other three members of said linkage,
      6. said pivots defining a planar quadrangle perpendicular to said pivot axes, said quadrangle being inclined relative to said plane defined by said first and second axes at an angle of 45° to 60°;
   i. a drive chain trained over said chain wheel, one of said sprockets, and said guide wheels; and
   j. manually operable means for shifting said support relative to said carrier member about said axes of said pivots.

2. A vehicle as set forth in claim 1, wherein said quadrangle is offset from said second axis in a direction toward said first axis.

3. A vehicle as set forth in claim 1, further comprising two guide wheel shafts mounted on said support and spaced from said pivots, said guide wheel shafts respectively carrying said first and second guide wheels.

4. A vehicle as set forth in claim 1, further comprising a first guide wheel shaft mounted on said support and having an axis, a cage pivotally mounted on said first guide wheel shaft and carrying a second guide wheel shaft having an axis spacedly parallel to the axis of said first guide wheel shaft, said guide wheels being mounted on said guide wheel shafts respectively, and yieldably resilient means biasing said cage to pivot on said first guide wheel shaft in a direction to tension and chain.

5. A vehicle as set forth in claim 1, wherein the spacing of the pivot axes associated with said two guide links is equal, and the spacing of the two pivot axes associated with said carrier member is different from the spacing of the two pivot axes associated with said support.

* * * * *